(12) United States Patent
Dodd

(10) Patent No.: US 6,467,167 B2
(45) Date of Patent: Oct. 22, 2002

(54) METHOD OF PRODUCING A LINING ARTEFACT

(75) Inventor: Alec G Dodd, Derby (GB)

(73) Assignee: Rolls-Royce plc, London (GB)

( * ) Notice: Subject to any disclaimer, the term of this patent is extended or adjusted under 35 U.S.C. 154(b) by 40 days.

(21) Appl. No.: 09/759,529

(22) Filed: Jan. 16, 2001

(65) Prior Publication Data

US 2001/0009108 A1 Jul. 26, 2001

(30) Foreign Application Priority Data

Jan. 26, 2000 (GB) .............................. 0001679

(51) Int. Cl.$^7$ .............................. B21D 53/78
(52) U.S. Cl. ............... 29/889.72; 29/889.7; 29/889.71
(58) Field of Search ............ 29/402.09, 889.2, 29/889.23, 889.21, 889.22, 889.6, 889.61, 889.7, 889.71, 889.72, 889.722; 138/98

(56) References Cited

U.S. PATENT DOCUMENTS

| | | | | |
|---|---|---|---|---|
| 1,930,285 A | * | 10/1933 | Robinson | ................. 138/143 |
| 2,366,164 A | * | 1/1945 | Weick et al. | ............... 228/178 |
| 2,440,127 A | * | 4/1948 | Stulen | ...................... 29/889.6 |
| 4,153,386 A | | 5/1979 | Leogrande | |
| 4,413,949 A | | 11/1983 | Scott | |
| 4,723,579 A | * | 2/1988 | Hyodo et al. | ............... 138/124 |
| 5,000,426 A | * | 3/1991 | Campana et al. | ............. 266/48 |
| 5,240,376 A | * | 8/1993 | Velicki | .................... 29/889.71 |
| 5,344,063 A | * | 9/1994 | Johnston et al. | ............ 228/157 |
| 5,810,053 A | * | 9/1998 | Mandich | ....................... 138/98 |
| 5,941,446 A | * | 8/1999 | Yasui | ...................... 29/889.72 |
| 5,941,895 A | * | 8/1999 | Myler et al. | ................ 606/195 |

* cited by examiner

Primary Examiner—S. Thomas Hughes
Assistant Examiner—Marc Jimenez
(74) Attorney, Agent, or Firm—W. Warren Taltavull; Manelli, Denison & Selter PLLC

(57) ABSTRACT

A hollow liner (14) for fitting in the interior of a aerofoil vane (10) is crimped prior to fitting within the vane (10). Following fitting, the liner (14) is expanded so as to fit snugly within the vane (10). The technique permits the insertion of liners (14) into vanes (10) that are so configured as to preclude the insertion of conventional liners.

8 Claims, 2 Drawing Sheets

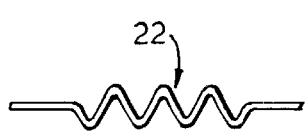
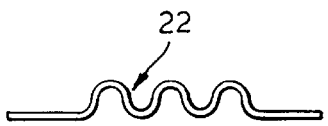
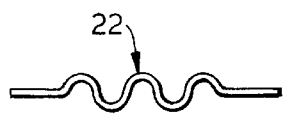
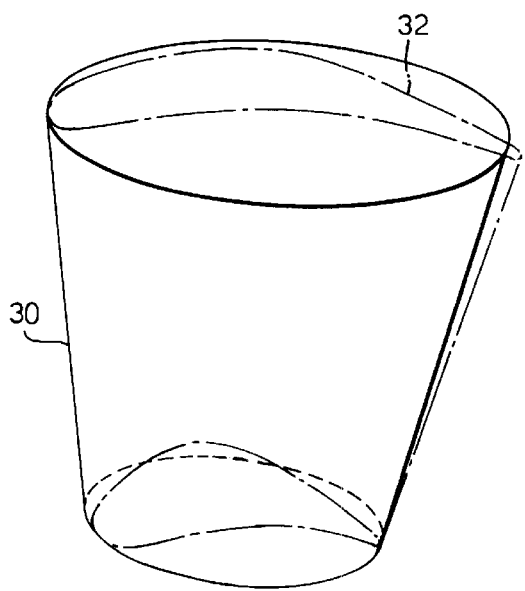
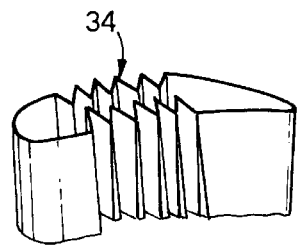

METHOD OF PRODUCING A LINING ARTEFACT

FIELD OF THE INVENTION

The present invention relates to the manufacture of an artefact comprising a liner which is intended to reside in spaced relationship within a hollow structure.

BACKGROUND OF THE INVENTION

More particularly, the invention relates to the manufacture of a liner which is required to reside in said spaced relationship within a hollow structure, the interior of which is so shaped as to preclude inserting the liner therein, when the liner has its operational shape.

SUMMARY OF THE INVENTION

The invention has particular efficacy, where the liner is multi-perforated, and is intended to fit within the hollow interior of a guide vane which has opposing ends of radically differing profiles, and is utilised in a gas turbine engine. The liner is fitted for the purpose of enabling an impingement cooling airflow onto the interior surface of the guide vane during operation thereof in an associated said gas turbine engine.

According to the present invention, a method of manufacturing and fitting a hollow liner within a hollow structure which has respective open ends of differing proportions, comprising the steps of producing said hollow liner and crimping a portion thereof so as to enable said liner to be fitted into said hollow structure, then fitting said liner into said hollow structure and subsequently stretching said liner so as to substantially obviate said crimping and form said liner to its desired final shape within said hollow structure.

BRIEF DESCRIPTION OF THE DRAWINGS

The invention will now be described, by way of example, and with reference to the accompanying drawings, in which:

FIGS. 4 to 6 depict alternative crimp forms.

FIG. 7 depicts an alternative mode of manufacturing an impingement cooling liner in accordance with the present invention.

FIG. 8 depicts an impingement cooling liner crimped in accordance with the present invention.

DETAILED DESCRIPTION OF THE INVENTION

Figure 1:
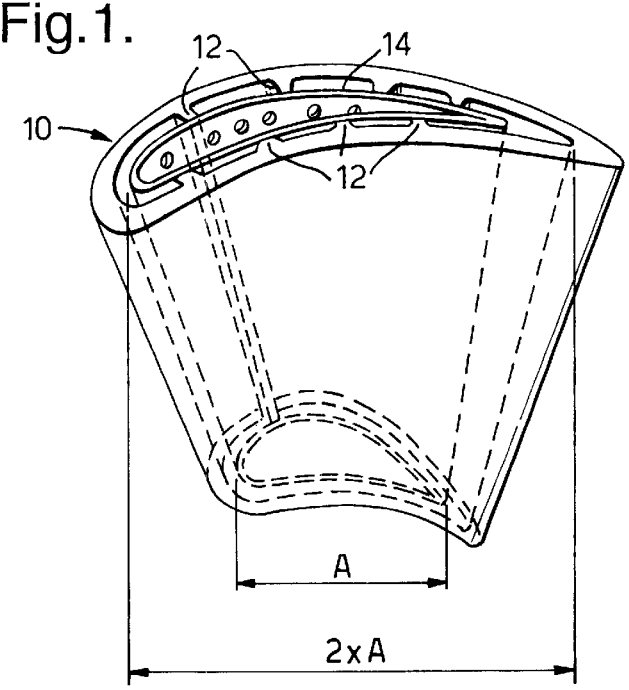
FIG. 1 is a pictorial representation of a gas turbine engine guide vane, which includes a perforated impingement cooling liner in accordance with the present invention.

Referring to FIG. 1, a hollow guide vane 10 has a number of ribs 12 formed on its inner wall surface, which extend the full length of the vane 10, though only one rib 12 is thus shown. The ribs 12 locate a perforated liner 14 in spaced relationship with the inner wall surface of the vane 10.

The guide vane 10 is formed in the configuration of an aerofoil. However, in view of the greater understanding of aerodynamic flows which today's designers possess, accompanied by the ever increasing demand to achieve higher engine efficiency, the overall shape of guide vanes has changed dramatically, resulting in profiles, the proportions of which change radically from one end of the vane to the other end thereof, as in guide vane 10. As is seen in FIG. 1, the relative chordal dimensions A at the end extremities of vane 10 are approximately 2:1. However, the relative width dimensions are approximately 1:2. It would thus be impossible to insert a liner 14 of corresponding shape in either end of vane 10.

Figure 2:
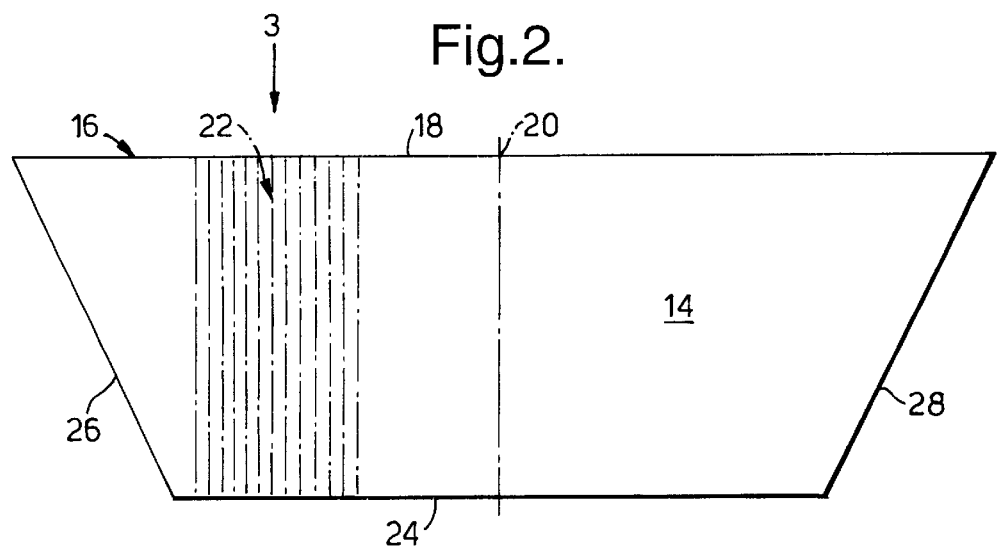
FIG. 2 is a developed view of the liner of FIG. 1, prior to perforation.

Referring now to FIG. 2, liner 14 is first produced as a developed shape of the finished article, which shape, in the present example, defines an actual or near trapezoid 16. The trapezoid 16 is then crimped a sufficient number of times, on both sides of datum line 20, (though crimps 22 are only shown on one side thereof), so as to draw each end portion thereof towards datum line 20, and thus shortens it.

Figure 3:
FIG. 3 is a view on FIG. 2 in the direction of arrow 3.

The number of crimps 22, and their proportions, as shown in FIG. 2 and FIG. 3 are merely illustrative. Their actual proportions and numbers will be dictated by the proportions of the vane 10 in which the liner 14 is to be fitted. Thus, in the present example, FIG. 2 depicts six crimps 22 extending from edge 18 to edge 24. The pitch of the crimps 22, multiplied by the number thereof, equals the dimension B (FIG. 3), which is repeated on the opposing side of datum line 20.

After crimping, the trapezoid 16 is folded about datum line 20, to bring edges 26 and 28 together, and the resulting liner 14 inserted into the vane 10, via its wider, shorter end. Thereafter, a forming tool (not shown) is inserted in liner 14, and a force applied thereon in a direction chordally of the liner 14 and vane 10, so as to expand liner 14 by straightening the crimps 22.

An alternative mode of reforming liner 14 may be utilized, and consists of filling it with an elastomeric material, which is then pressurized and thus causes liner 14 to expand.

The crimps 22 shown in FIG. 2 are of inverted V shape and stand proud of one side only of trapezoid 16. however, as depicted in FIG. 4, crimps 22 could be formed so as to alternately protrude from both sides thereof.

FIG. 5 depicts another alternative, wherein the crimps 22 are corrugated in serpentine manner, and protrude from one side only. However, the serpentine corrugations could, if so desired, protrude alternately from both sides, as shown in FIG. 6.

A further method of manufacturing liner 14, is by deforming a frusto-conical tube 30 (FIG. 7) of circular cross section into the finished desired shape, and then, as shown in FIG. 8, crimping the side walls thereof over at least a major portion of its length. The crimps 34 are tapered, being their widest at that end of the tube 30 which defines the longest chordal dimension. A sufficient number of crimps, of appropriate proportions, are formed so as to draw the long ends of the liner together, to allow insertion of the tube 30 into the smaller end of the vane 10 (FIG. 1). Stretching of the liner tube 30 can be effected as described hereinbefore, with respect to FIGS. 1 to 3.

I claim:

1. A method of manufacturing and fitting a hollow liner within a hollow aerofoil having an interior surface provided with a plurality of protruding members and which has respective open ends of differing proportions, comprising the steps of:

producing said hollow liner and crimping a portion thereof so as to enable said liner to be fitted into said hollow aerofoil, fitting said liner into said hollow aerofoil, and subsequently stretching said liner so as to substantially modify said crimping and form said liner to its desired final shape with portions of said hollow liner engaging at least some of said protruding members thereby providing spacing between said interior surface of said aerofoil and said hollow liner within said hollow aerofoil.

2. A method of manufacturing and fitting a hollow liner as claimed in claim 1 including the steps of:

producing the liner as a developed plane form, crimping the plane form to shorten said liner, folding the plane form to join opposing ends thereof, and then inserting the resulting liner in the hollow aerofoil and stretching said liner to substantially obviate said crimps and form said liner into its final desired shape within said hollow aerofoil.

3. A method of manufacturing and fitting a hollow liner within a hollow aerofoil as claimed in claim 1 including the steps of:

forming a frusto-conical tube of circular cross section, each end of which has a peripheral length equal to the peripheral length of a respective end of said hollow aerofoil, deforming said tube to the final desired shape of said liner, crimping the end thereof having the greater peripheral length, so as to effectively shorten said liner, inserting said liner in the end of the hollow aerofoil having a smaller periphery, then stretching said liner to substantially obviate said crimps and form said liner into its final desired shape within said hollow aerofoil.

4. A method of manufacturing and fitting a hollow liner into a hollow aerofoil as claimed in claim 1, wherein said crimps define a series of ridges.

5. A method of manufacturing and fitting a hollow liner into a hollow aerofoil as claimed in claim 1, wherein said crimps define a series of sinusoidal corrugations.

6. A method of manufacturing and fitting a hollow liner into a hollow aerofoil as claimed in claim 1 wherein said crimps are formed on only one side of the material from which said liner is manufactured.

7. A method of manufacturing and fitting a hollow liner into a hollow aerofoil as claimed in claim 1 wherein said crimps are formed on both sides of the material from which said liner is manufactured.

8. A method of manufacturing and fitting a hollow liner into a hollow aerofoil as claimed in claim 1, wherein said hollow aerofoil is a gas turbine engine guide.

\* \* \* \* \*